US012566780B2

(12) United States Patent
Mohan et al.

(10) Patent No.: US 12,566,780 B2
(45) Date of Patent: Mar. 3, 2026

(54) HYBRID CLASSICAL-QUANTUM UNSUPERVISED MULTICLASS CLASSIFICATION

(71) Applicant: Fujitsu Limited, Kawasaki (JP)

(72) Inventors: Ankith Mohan, Blacksburg, VA (US); Sarvagya Upadhyay, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 18/468,496

(22) Filed: Sep. 15, 2023

(65) Prior Publication Data

US 2025/0094447 A1 Mar. 20, 2025

(51) Int. Cl.
| | |
|---|---|
| *G06F 16/00* | (2019.01) |
| *G06F 16/28* | (2019.01) |
| *G06N 10/60* | (2022.01) |

(52) U.S. Cl.
CPC ........... *G06F 16/285* (2019.01); *G06N 10/60* (2022.01)

(58) Field of Classification Search
CPC .............................. G06F 16/285; G06N 10/60
USPC ......................................................... 707/737
See application file for complete search history.

(56) References Cited

U.S. PATENT DOCUMENTS

2019/0197426 A1* 6/2019 Kawano ................... G06N 3/08
707/707

2020/0213276 A1* 7/2020 Luongo ............... G06F 18/2155
707/707
2022/0179882 A1* 6/2022 Cervantes ............. G06F 16/285
707/707

FOREIGN PATENT DOCUMENTS

| | | | | |
|---|---|---|---|---|
| WO | WO-2020095051 A2 * | 5/2020 | ............. | G16C 10/00 |
| WO | WO-2022155277 A1 * | 7/2022 | ............. | G06N 7/01 |
| WO | WO-2023213821 A1 * | 11/2023 | ............. | G06N 10/20 |

OTHER PUBLICATIONS

Bae et al. "Quantum state discrimination and its applications" 2015.
Helstrom et al. "Quantum detection and estimation theory" 1969.
Bharti et al. "Iterative quantum-assisted eigensolver" 2021.
Chefles et al. "Unambiguous discrimination between linearly independent states" 1998.
Hsu et al. "Multi-class Classification without Multi-class Labels" 2019.

* cited by examiner

*Primary Examiner* — Alexandria Y Bromell
(74) *Attorney, Agent, or Firm* — Maschoff Brennan

(57) ABSTRACT

A method may include obtaining a multi-dimensional training dataset that includes multiple datums. Each of the datums may correspond to a number of quantum bits (qubits) and may represent a quantum state. The method may also include generating, using a quantum computing device, a Gram matrix based on the multiple datums. In addition, the method may include determining, using a classical computing device, multiple operators according to a constraint defined by the Gram matrix. Each of the operators may be configured as a proxy for a corresponding datum. Further, the method may include assigning, using the classical computing device, each of the operators to a label.

11 Claims, 5 Drawing Sheets

_300_

Construct A Gram Matrix Using
A Quantum Computing Device _302_

Use The Gram Matrix To Construct
A Reduced Semi-Definite Program _304_

Solve The Semi-Definite Program
To Obtain An Optimal Solution _306_

Use The Optimal Solution To Classify
Datums Into A Specified Number Of Labels _308_

Output Each Datum And Clusters
That The Datums Belong To _310_

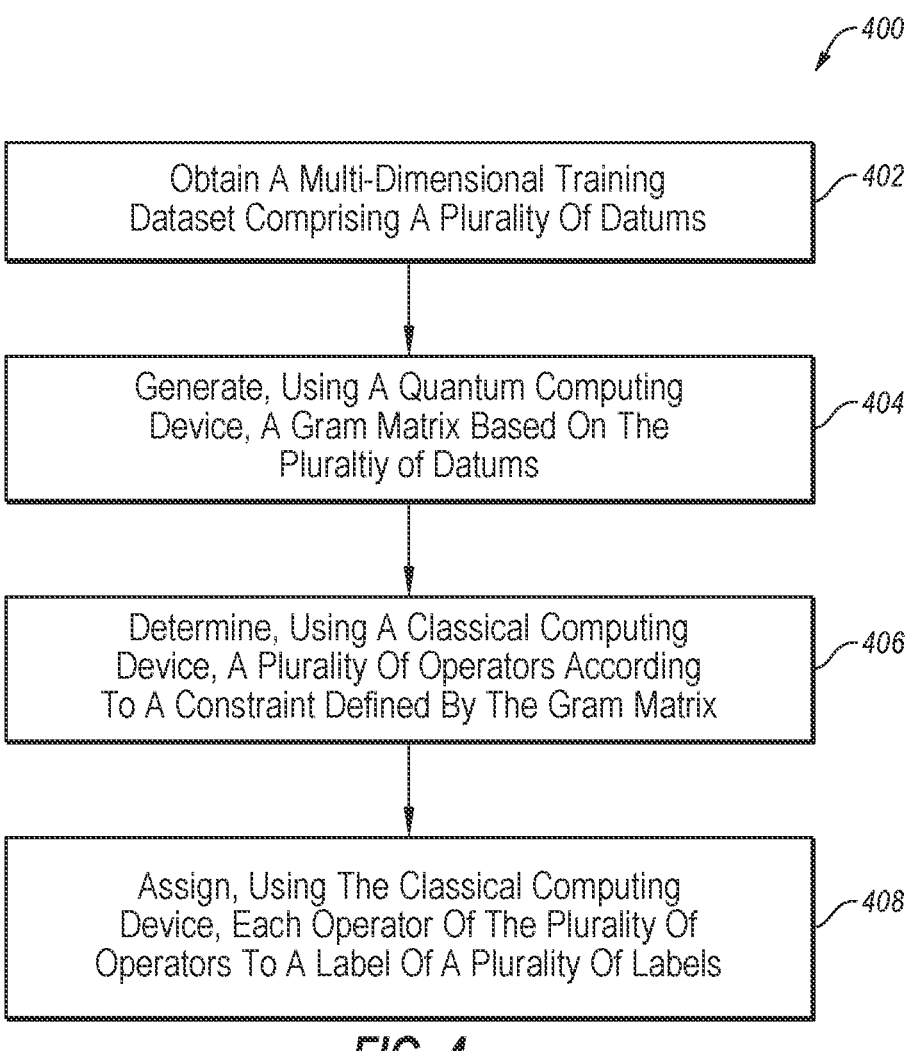

400

Obtain A Multi-Dimensional Training
Dataset Comprising A Plurality Of Datums
402

Generate, Using A Quantum Computing
Device, A Gram Matrix Based On The
Pluraltiy of Datums
404

Determine, Using A Classical Computing
Device, A Plurality Of Operators According
To A Constraint Defined By The Gram Matrix
406

Assign, Using The Classical Computing
Device, Each Operator Of The Plurality Of
Operators To A Label Of A Plurality Of Labels
408

FIG. 4

HYBRID CLASSICAL-QUANTUM UNSUPERVISED MULTICLASS CLASSIFICATION

FIELD

The present disclosure generally relates to a system and method of hybrid classical-quantum unsupervised multiclass classification.

BACKGROUND

Unless otherwise indicated in the present disclosure, the materials described in the present disclosure are not prior art to the claims in the present application and are not admitted to be prior art by inclusion in this section.

Classical computing devices may use bits capable of representing a dataset as sequences of ones and zeros. Classical computing devices may perform computations to manipulate this dataset. However, the computations performed by the classical computing devices may be limited due to a dimensionality of datums of the dataset and/or the computations. Quantum computing devices may use quantum bits (qubits) capable of representing the dataset as sequences of ones, zeros, or ones and zeros simultaneously. Quantum computing devices may perform some computations more efficiently and/or accurately than classical computing devices. However, quantum computing devices may be costly to perform computations at scale sufficient to perform multiclass classification.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

According to an aspect of an embodiment, a method may include obtaining a multi-dimensional training dataset that includes multiple datums. Each of the datums may correspond to a number of qubits and may represent a quantum state of a quantum system. The method may also include generating, using a quantum computing device, a Gram matrix based on the multiple datums. In addition, the method may include determining, using a classical computing device, multiple operators according to a constraint defined by the Gram matrix. Each of the operators may be configured as a proxy for a corresponding datum. Further, the method may include assigning, using the classical computing device, each of the operators to a label.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which:

FIG. 4 illustrates a flowchart of an example method of classifying a multi-dimensional training dataset.

DETAILED DESCRIPTION

Figure 1:
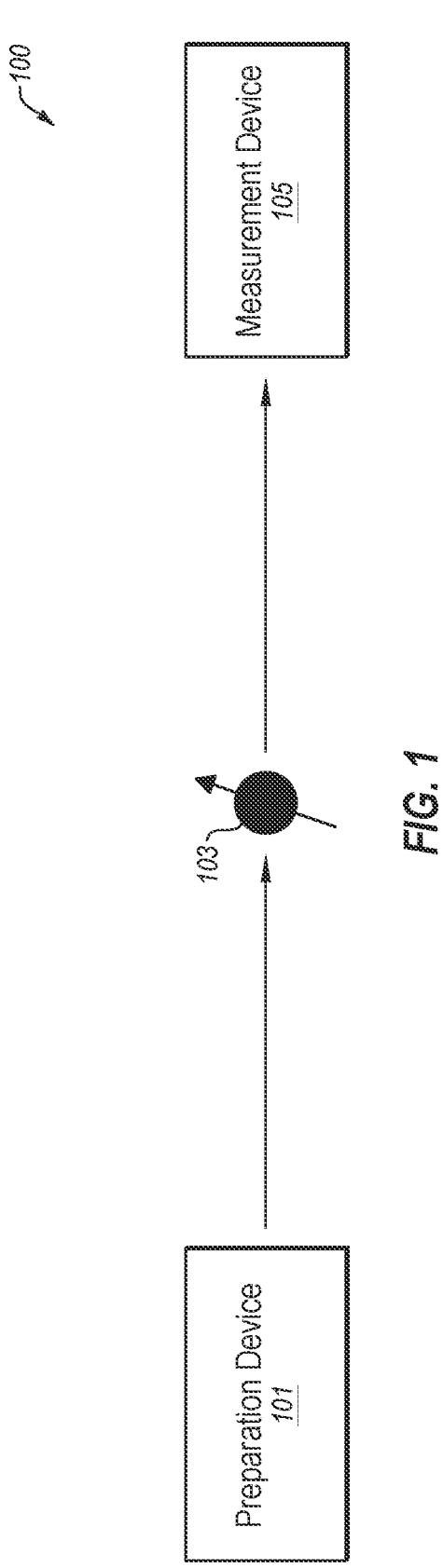
FIG. 1 illustrates a block diagram of an example operating environment in which quantum states of a quantum system may be detected.

A classical computing device uses bits (e.g., binary bits) that are configured to store values of zero or one to represent a dataset. The classical computing device may perform various computations using the bits to manipulate or store the dataset. The classical computing device may not be able to perform computations when the dataset includes a quantum dataset (e.g., a multi-dimensional dataset) that includes a dimensionality that causes exponentially sized computations to be performed. For example, the quantum dataset may include a large number of variables by which the datum of the quantum dataset is characterized.

A quantum computing device uses qubits that are configured to store values of zero, one, or a superposition of both zero and one. Because qubits are capable of simultaneously storing multiple values, quantum computing devices may be able to manipulate the quantum dataset despite the exponentially sized computations. Consequently, the quantum computing device may more efficiently perform computations involving the quantum dataset than the classical computing device.

In some embodiments, the quantum datasets may include datums that each represent datapoints or pieces of information associated with one or more topics. For example, each of the datums may be representative of news articles associated with one or more topics of news. As another example each of the datums may be representative of medical images associated with one or more medical conditions and/or medical states. As yet another example, each of the datums may be representative of microstructures and/or molecular data associated with one or more synthetic materials. Each of the datums may be stored as a number of qubits and the multiclass classification may be performed to label the datums using clustering algorithms.

The multiclass classification of the datums may be performed using a semi-definite program, which may result in exponentially sized computations due to the dimensionality of the datums (e.g., the number of qubits corresponding to the datums). Therefore, the classical computing device may not be capable of performing the computations or may take a significant amount of time to perform the computations. The amount of time the classical computing device takes to perform the computations may be prohibitive. The quantum computing device may perform the computations using the quantum dataset quicker than the classical computing device. However, performing the entire multiclass classification on the quantum computing device may be complex and may be cost prohibitive.

Some embodiments described in the present disclosure may include multiclass classification of the quantum dataset by a quantum classical-hybrid computing system that includes a classical computing device and a quantum computing device. The multiclass classification may be modelled as the semi-definite program, which the quantum computing device may simplify to permit the classical computing device to determine operators that function as proxies for the datums in the quantum dataset. The classical computing device may perform multiclass classification using the operators to assign labels to the corresponding datums.

In some embodiments, the quantum computing device may generate a Gram matrix based on the quantum dataset. The classical computing device may determine the operators according to a constraint that is defined by the Gram matrix. Each operator may function as a proxy to permit the classical computing device to label corresponding datums. Each operator may include information about the corresponding datum (e.g., quantum state) to be identified. The classical computing device may assign labels to each of the operators. The labels may indicate the quantum state of the corresponding datum.

At least some embodiments described in the present disclosure may permit the datums of the quantum dataset to be classified without incurring the costs of implementing the multiclass classification solely on a quantum device and without incurring delays experienced by classical computing devices when manipulating the quantum dataset. In addition, at least some embodiments described in the present disclosure may permit classical data to be encoded as quantum kernels to represent the classical data in a larger feature space.

These and other embodiments of the present disclosure will be explained with reference to the accompanying figures. It is to be understood that the figures are diagrammatic and schematic representations of such example embodiments, and are not limiting, nor are they necessarily drawn to scale. In the figures, features with like numbers indicate like structure and function unless described otherwise.

FIG. 1 illustrates a block diagram of an example operating environment 100 in which quantum states of a quantum system 103 may be detected, in accordance with at least one embodiment of the present disclosure. The environment 100 may include a preparation device 101, the quantum system 103, and a measurement device 105. In some embodiments, the quantum states of the quantum system 103 may be detected by performing multiclass classification of quantum data that includes datums that represent different quantum states.

In some embodiments, the preparation device 101 and/or the measurement device 105 may include code and routines configured to enable a computing system to perform one or more operations. Additionally or alternatively, the preparation device 101 and/or the measurement device 105 may be implemented using hardware including a processor, a microprocessor (e.g., to perform or control performance of one or more operations), a field-programmable gate array (FPGA), or an application-specific integrated circuit (ASIC). In some other instances, the preparation device 101 and/or the measurement device 105 may be implemented using a combination of hardware and software. In the present disclosure, operations described as being performed by the preparation device 101 and/or the measurement device 105 may include operations that the preparation device 101 and/or the measurement device 105 may direct one or more corresponding systems to perform. The measurement device 105 may be configured to perform a series of operations to detect the quantum state of the quantum system 103 as described in more detail below.

The preparation device 101 may generate a series of quantum states $|\Psi_j\rangle$ of the quantum system 103. Each of the quantum states may be generated in accordance with a pre-defined probability represented by $q_i$ in which i may represent a first counter variable indicating a current quantum state. The series of quantum states may be represented by the datums of the quantum dataset. Each of the datums may correspond to a number of qubits. The measurement device 105 may determine a series of measurement operators $M=\{M_1, M_2, \ldots, M_L\}$ to identify the datums (e.g., quantum states). In some embodiments, a sum of the measurement operators may be equal to an identity operator and may include a positive semidefinite property such that all values of the measurement operators are greater than or equal to zero. In these and other embodiments, the identify operator may include a diagonal matrix that includes values of ones on the diagonal. In addition, the sum of the measurement operators may be equal to the identity operator to obtain a probability distribution over of the measurement operators.

In some embodiments, a probability of the measurement device 105 identifying a current datum based on a different datum may be determined as defined in Equation 1.

$$q_j\langle\Psi_j|M_i|\Psi_j\rangle \qquad \text{Equation 1}$$

In Equation 1, j may represent a second counter variable indicating the different datum, $M_i$ may represent the current measurement operator, $\Psi_j$ may represent the datum corresponding to the different quantum state, and $q_j$ may represent the pre-defined probability of the different quantum state.

In some embodiments, the measurement device 105 may operate according to at least one probability function. For example, the measurement device 105 may operate according to a probability of correct detection function, an error probability function, or a probability of inconclusive outcome function. The probability of correct detection function may be determined as defined in Equation 2.

$$\sum_{i=1}^{N} q_i\langle\Psi_i|M_i|\Psi_i\rangle \qquad \text{Equation 2}$$

In Equation 2, N may represent a number of datums in the quantum dataset representative of the quantum states of the quantum system 103, i may represent the first counter variable, $M_i$ may represent the current measurement operator, $\Psi_i$ may represent the datum corresponding to the current quantum state, and $q_i$ may represent the pre-defined probability of the current quantum state. The error probability function may be determined as defined in Equation 3.

$$\sum_{i=1}^{N+1} \sum_{j=1; j\neq i}^{N} q_j\langle\Psi_j|M_i|\Psi_j\rangle \qquad \text{Equation 3}$$

In Equation 3, N may represent the number of datums in the quantum dataset representative of the quantum states of the quantum system 103, i may represent the first counter variable, j may represent the second counter variable, $M_i$ may represent the current measurement operator, $\Psi_j$ may represent the datum corresponding to the different quantum state, and $q_j$ may represent the pre-defined probability of the different quantum state. The probability of inconclusive outcome function may be determined as defined in Equation 4.

$$\sum_{i=1}^{N} q_i \langle \Psi_i | M_{N+1} | \Psi_i \rangle \qquad \text{Equation 4}$$

In Equation 4, N may represent the number of datums in the quantum dataset representative of the quantum states of the quantum system 103, i may represent the first counter variable, $M_{N+1}$ may represent a corresponding measurement operator, Ti may represent the datum corresponding to the current quantum state, and $q_i$ may represent the pre-defined probability of the current quantum state. In some embodiments, the sum of the probability of correct detection function, the error probability function, and the probability of inconclusive outcome function may be equal to one.

In some embodiments, the measurement device 105 may operate according to a minimum error strategy, an unambiguous strategy, or any other appropriate strategy to identify the datums of the quantum dataset. For the minimum error strategy, the measurement device 105 may identify the datums of the quantum dataset so as to minimize an average error without identifying any inconclusive datums. For example, the measurement device 105 may identify the datums such that the inconclusive outcome function and the error probability function is minimized to maximize the probability of correct detection function. For the unambiguous strategy, the measurement device 105 may identify the datums so as to eliminate errors but may include inconclusive results. For example, the measurement device 105 may identify the datums such that the error probability function is equal to zero and the inconclusive outcome function is greater than zero but minimized.

In some embodiments, the measurement device 105 may identify the datums using a semi-definite program that maximizes a model function as defined in Equation 5.

$$\max \sum_{i=1}^{N} \sum_{j=1}^{N} q_j \langle \Psi_j | M_i | \Psi_j \rangle \qquad \text{Equation 5}$$

In Equation 5, N may represent the number of datums in the quantum dataset representative of the quantum states of the quantum system 103, i may represent the first counter variable, j may represent the second counter variable, $q_j$ may represent the pre-defined probability of the different quantum state, $\Psi_j$ may represent the datum corresponding to the different quantum state, and $M_i$ may represent the current measurement operator. The measurement device 105 may determine the measurement operators that maximize the model function and such that the sum of the measurement operators is equal to one. In some embodiments, the semi-definite program may include a reward factor $R_{ij}$ that represents an amount to increase the semi-definite program when the current datum is correctly identified based on the different datum. Equation 5 may result in an exponentially sized computation in that it used to solve for an N number of operators and each of the operators may be of a size equal to $2^d \times 2^d$ in which N may represent the number of datums in the quantum dataset representative of the quantum states of the quantum system 103 and d may represent a number of qubits corresponding to a quantum state.

In some embodiments, the measurement device 105 may identify the datums using a reduced dual of the semi-definite program as defined in Equation 6.

$$\min \, Tr(Y) \text{ such that } Y \geqslant \sum_{j=1}^{N} q_j |\Psi_j\rangle\langle\Psi_j| \forall_i \in [N] \qquad \text{Equation 6}$$

In Equation 6, Y may represent a Hermitian operator, N may represent the number of datums in the quantum dataset representative of the quantum states of the quantum system 103, i may represent the first counter variable, j may represent the second counter variable, $q_j$ may represent the pre-defined probability of the different quantum state, and $\Psi_j$ may represent the datum corresponding to the different quantum state. In some embodiments, the reduced dual of the semi-definite program may include the reward factor $R_{ij}$ that represents the amount to increase the reduced dual of the semi-definite program when the current datum is correctly identified based on the different datum. Equation 6 may also result in an exponentially sized computation in that it is used to solve for an N number of operators and each of the operators may be of a size equal to $2^d \times 2^d$ in which N may represent the number of datums in the quantum dataset representative of the quantum states of the quantum system 103 and d may represent the number of qubits corresponding to a quantum state.

An amount of time the measurement device 105, when implemented as a classical computing device, may take to determine the operators for each of the datums representative of the quantum states of the quantum system 103 may be based on the exponential size of Equation 5 and/or Equation 6 and may be so long that multiclass classification of the quantum states cannot readily be performed using the measurement device 105 implemented as the classical computing device performing computations in accordance with Equation 5 or Equation 6.

Modifications, additions, or omissions may be made to the environment 100 without departing from the scope of the present disclosure. For example, the designations of different elements in the manner described is meant to help explain concepts described herein and is not limiting. For instance, in some embodiments, the preparation device 101, the quantum system 103, and the measurement device 105 are delineated in the specific manner described to help with explaining concepts described herein but such delineation is not meant to be limiting. Further, the environment 100 may include any number of other elements or may be implemented within other systems or contexts than those described.

Figure 2:
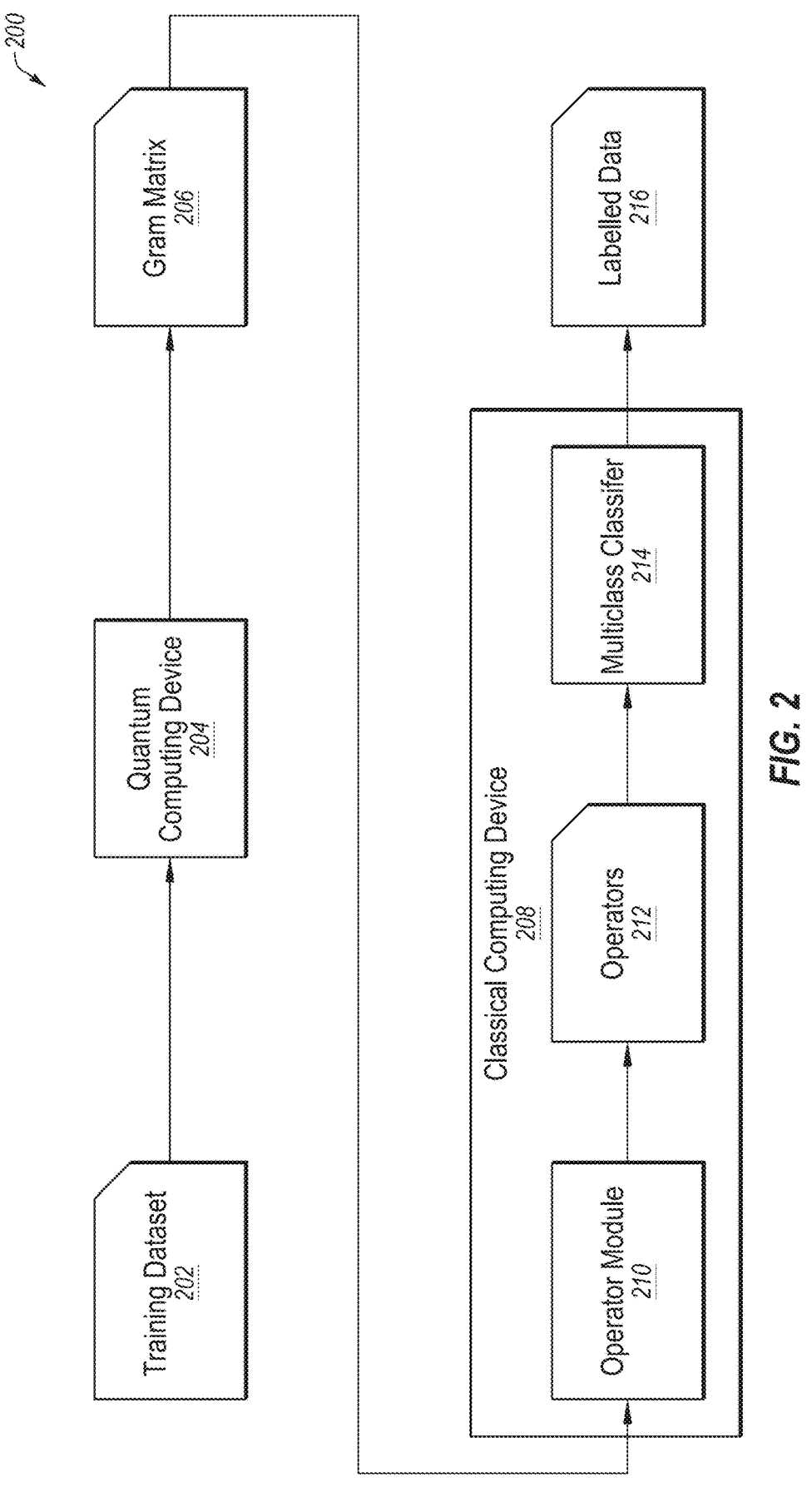
FIG. 2 illustrates a process flow in which datums of a training dataset that is stored in qubits may be identified and assigned to various labels using a quantum computing device and a classical computing device.

FIG. 2 illustrates a process flow 200 in which datums of a training dataset 202 that is stored in qubits may be identified and assigned to various labels using a quantum computing device 204 and a classical computing device 208, in accordance with at least one embodiment of the present disclosure. In some embodiments, the quantum computing device 204 may include a noisy intermediate-scale quantum (NISQ) device.

The quantum computing device 204 and the classical computing device 208 may classify the datums of the training dataset 202 by assigning each of the datums of the training dataset 202 to a label of a specified number of labels using various techniques and clustering algorithms as described in the present disclosure. In some embodiments, the specified number of labels may be pre-defined prior to the multiclass classification is performed. For example, a user may select particular labels to be used for the multiclass classification. As another example, the quantum computing device 204 and/or the classical computing device 208 may select the particular labels based on the one or more topics associated with the training dataset 202.

In some embodiments, the quantum computing device 204 may include code, routines, and quantum circuits configured to enable a quantum computing system to perform one or more operations. In some other instances, the quantum computing device 204 may be implemented using a combination of hardware and software. The quantum computing device 204 may be configured to perform a series of operations with respect to the training dataset 202 and in relation to example methods 300 and/or 400 as described in more detail below.

The quantum computing device 204 may receive the training dataset 202. In some embodiments, the training dataset 202 may include a multi-dimensional dataset. For example, the multi-dimensional dataset may be quantum data that is stored in qubits and each of the datums may correspond to the number of qubits. Consequently, each of the datums may also be multi-dimensional. In some embodiments, multi-dimensional data may include data that is stored in qubits that may simultaneously to store values as zero, one, or a superposition of both zero and one. In addition, each of the datums may represent a quantum state of a quantum system. For example, each of the datums may represent the quantum state of the corresponding number of qubits. The datums may be representative of news articles, medical images, microstructures, molecular data, or any other appropriate data.

In some embodiments, the classical computing device 208 may receive a two-dimensional training dataset (e.g., a classical dataset stored in classical bits). In these and other embodiments, the two-dimensional training dataset may include datums and each datum may correspond to a number of classical bits. Additionally or alternatively, the classical computing device 208 may encode the two-dimensional training dataset to generate the training dataset 202 as the multi-dimensional training dataset. In some embodiments, the classical computing device 208 may encode each of the classical datums to different datums of the training dataset 202.

The training dataset 202 may be defined as defined in Equation 7.

$$\{|\Psi_1\rangle, |\Psi_2\rangle, \ldots, |\Psi_N\rangle\} \qquad \text{Equation 7}$$

In equation 7, $\Psi$ may represent the different datums (e.g., quantum states) of the training dataset 202 and N may represent the total number of datums of the training dataset 202.

The quantum computing device 204 may generate a Gram matrix 206 based on the training dataset 202. For example, the quantum computing device 204 may use quantum circuits within the quantum computing device 204 to construct the Gram matrix 206. In some embodiments, the quantum computing device 204 may generate the Gram matrix 206 using one or more copies of the training dataset 202. The Gram matrix 206 may include multiple quantities or values. Each quantity or value of the Gram matrix 206 may include an inner product of the qubits of different datums within the training dataset 202. Due to the dimensionality of the qubits that store the different datums, the Gram matrix 206 may include a high dimensionality, which may result in an exponential computation that can be performed by the quantum computing device 204.

In some embodiments, the quantum computing device 204 may perform a Hadamard test to determine the quantities for the Gram matrix 206 (e.g., determine the inner product of the qubits of the different datums within the training dataset 202). The Hadamard test may include unitary operations on the qubits of the different datums within the training dataset 202 based on a control qubit. In some embodiments, if the control qubit is equal to one, a first transformation may be applied during the Hadamard test, if the control qubit is equal to zero, a second transformation may be applied during the Hadamard test, and if the control qubit is equal to a superposition of zero and one, a superposition of the first transformation and the second transformation may be applied during the Hadamard test. The quantum computing device 204 may output the Gram matrix 206 and provide it to the classical computing device 208.

In some embodiments, the classical computing device 208 may include code and routines configured to enable a computing system to perform one or more operations. Additionally or alternatively, the classical computing device 208 may be implemented using hardware including a processor, a microprocessor (e.g., to perform or control performance of one or more operations), an FPGA, or an ASIC. In some other instances, the classical computing device 208 may be implemented using a combination of hardware and software. In the present disclosure, operations described as being performed by the classical computing device 208 may include operations that the classical computing device 208 may direct one or more corresponding systems to perform. The classical computing device 208 may be configured to perform a series of operations with respect to the Gram matrix 206 and in relation to example methods 300 and/or 400 as described in more detail below.

The classical computing device 208 may include an operator module 210 configured to receive the Gram matrix 206. The operator module 210 may solve or determine operators 212 using a semi-definite program, such as a reduced semi-definite program, based on the Gram matrix 206. The operators 212 may function as proxies for corresponding datums in the training dataset 202. The operator module 210 may determine the operators 212 according to a constraint defined by the Gram matrix 206 as described in more detail below.

In some embodiments, the classical computing device 208 may identify the datums of the training dataset 202 in accordance with a simplified dual of the semi-definite program as defined in Equation 8.

$$\min\langle G, Y'\rangle \text{ such that } Y' \succcurlyeq \sum\nolimits_{j=1}^{N} q_j |j\rangle\langle j| \forall_i \in [N] \qquad \text{Equation 8}$$

In Equation 8, Y' may represent a Hermitian operator, G may represent the Gram matrix 206, N may represent the number of datums of the training dataset 202, j may represent the second counter variable, and $q_j$ may represent the predefined probability of the different quantum state. In some embodiments, the reduced dual of the semi-definite program may include the reward factor $R_{ij}$ that represents the amount to increase the simplified dual when the current datums is correctly identified based on the different datum. Equation 8 may include a computation that includes a size that is equal to an N number of operators multiplied by an N number of operators, which is based on the number of datums of the training dataset 202 rather than the dimensionality of the training dataset 202 in accordance with Equation 5.

The operator module 210 may determine the operators 212 using a polynomial function as defined in Equation 9.

$$\max \sum\nolimits_{i=1}^{N} \sum\nolimits_{j=1}^{N} q_j \langle j | M_i | j \rangle \text{ such that } \sum\nolimits_{i \in [N]} M_i = G \qquad \text{Equation 9}$$

In Equation 9, N may represent the number of datums of the training dataset 202, i may represent the first counter variable, j may represent the second counter variable, $q_j$ may represent the probability that the current quantum state comprises a pure quantum state, M may represent the current operator, and $Z_{i \in [N]}$ $M_i$=G may represent the constraint defined by the Gram matrix 206.

The classical computing device 208 may include a multiclass classifier 214 configured to receive the operators 212. The multiclass classifier 214 may assign each of the operators 212 to a label using a clustering algorithm. In some embodiments, the clustering algorithm may include a K-means algorithm. The multiclass classifier 214 may perform classification of the operators 212 and assign each of the operators 212 a label. As a result, since each of the operators 212 function as proxy for different datums of the training dataset 202, the datums are labeled.

The multiclass classifier 214 may output labelled data 216. In some embodiments, the labelled data 216 may include the labelled operators. In these and other embodiments, the labelled data 216 may include the datums of the training dataset 202 and the corresponding labels.

Modifications, additions, or omissions may be made to the process flow 200 without departing from the scope of the present disclosure. For example, the designations of different elements in the manner described is meant to help explain concepts described herein and is not limiting. For instance, in some embodiments, the training dataset 202, the quantum computing device 204, the Gram matrix 206, the classical computing device 208, and the labelled data 216 are delineated in the specific manner described to help with explaining concepts described herein but such delineation is not meant to be limiting. Further, the process flow 200 may include any number of other elements or may be implemented within other systems or contexts than those described.

Figure 3:
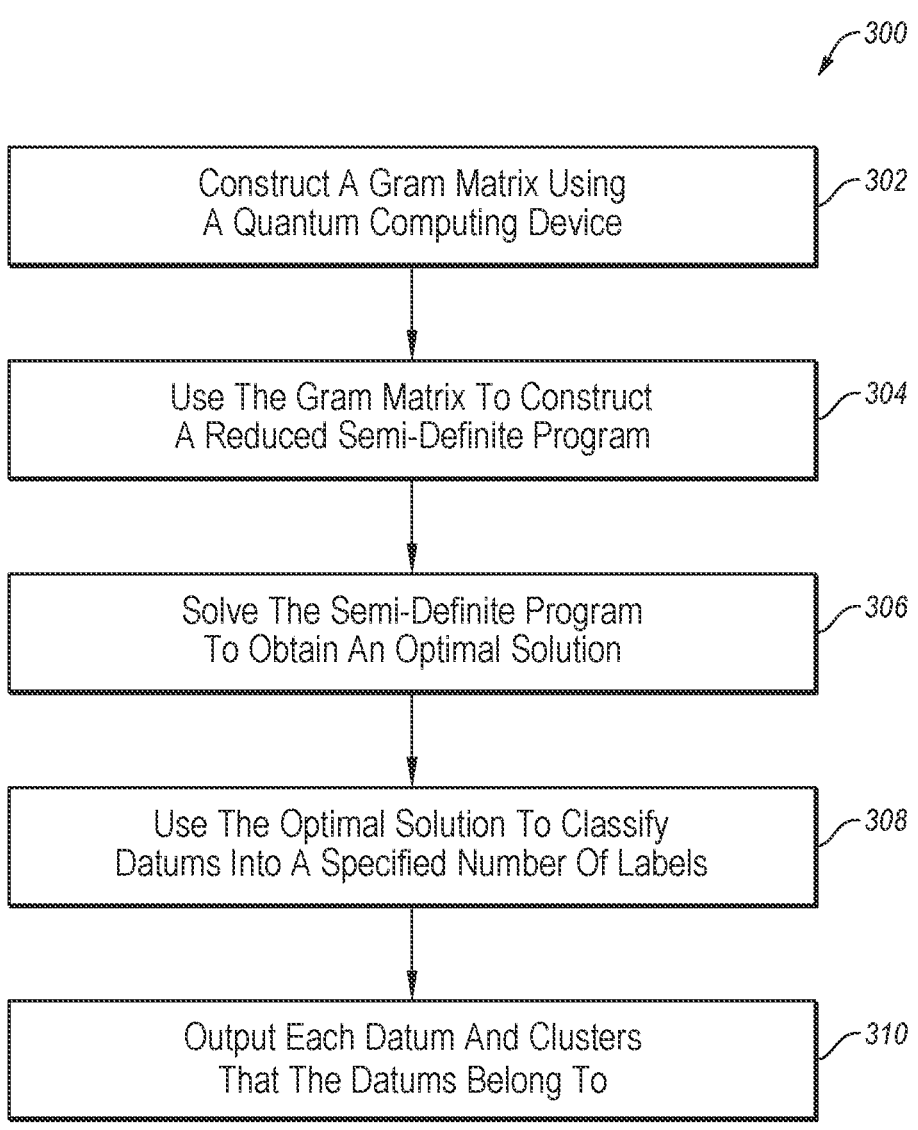
FIG. 3 illustrates a flowchart of an example method of labelling datums of a quantum dataset using the quantum computing device and the classical computing device of FIG. 2.

FIG. 3 illustrates a flowchart of an example method 300 of labelling datums of quantum dataset using the quantum computing device 204 and the classical computing device 208 of FIG. 2, in accordance with at least one embodiment of the present disclosure. The method 300 may be performed by any suitable system, apparatus, or device with respect to labelling quantum data. For example, the quantum computing device 204 or the classical computing device 208 of FIG. 2 may perform or direct performance of one or more of the operations associated with the method 300 with respect to labelling the datums of the quantum dataset. The method 300 may include one or more blocks 302, 304, 306, 308, or 310. Although illustrated with discrete blocks, the steps and operations associated with one or more of the blocks of the method 300 may be divided into additional blocks, combined into fewer blocks, or eliminated, depending on the particular implementation. Examples of labelling quantum data may include classifying drug compounds into classes that include similar properties and classifying synthetic materials based on similarities in microstructures of the synthetic materials using microscopic images of the synthetic materials.

At block 302, a Gram matrix may be constructed using a quantum computing device. The Gram matrix may be constructed based on a multi-dimensional training dataset. For example, the quantum computing device 204 of FIG. 2, may receive the training dataset 202 which may include the datums. In the example of classifying drug compounds, the training dataset may include data obtained from a GBD-13 database and the datums may represent one billion drug compounds. In the example of classifying synthetic material, the training dataset may include data obtained from one or more sources and the datums may represent different microstructures.

At block 304, the Gram matrix may be used to construct a reduced semi-definite program. For example, the classical computing device 208 may use the Gram matrix 206 to construct the reduced semi-definite program in accordance with Equation 6. At block 306, the semi-definite program may be solved to obtain an optimal solution. For example, the classical computing device 208 may solve the semi-definite program to obtain operators (e.g., the optimal solution) in accordance with Equation 8.

At block 308, the optimal solution may be used to classify the datums into a specified number of labels. For example, the classical computing device 208 may use the operators 212 to classify datums of the training dataset 202. At block 310, each datums and clusters that the datums belong to may be outputted. For example, the classical computing device 208 may output the labelled data 216 indicating the operators and corresponding labels and/or the datums and corresponding labels. In the example of classifying drug compounds, the classical computing device 208 may output the labelled data 216 including the datums representative of the drug compounds and labels identifying the corresponding drug compound. In the example of classifying synthetic material, the classical computing device 208 may output the labelled data 216 including the datums representative of the different microstructures and labels identifying the corresponding synthetic materials, which may permit various simulations to be performed.

FIG. 4 illustrates a flowchart of an example method 400 of classifying a multi-dimensional training dataset, in accordance with at least one embodiment of the present disclosure. The method 400 may be performed by any suitable system, apparatus, or device with respect to classifying multi-dimensional data. For example, the measurement device 105 of FIG. 1, the quantum computing device 204 of FIG. 2, or the classical computing device 208 of FIG. 2 may perform or direct performance of one or more of the operations associated with the method 400 with respect to classifying multi-dimensional data. The method 400 may include one or more blocks 402, 404, 406, or 408. Although illustrated with discrete blocks, the steps and operations associated with one or more of the blocks of the method 400 may be divided into additional blocks, combined into fewer blocks, or eliminated, depending on the particular implementation.

At block 402, a multi-dimensional training dataset comprising a plurality of datums may be obtained. In some embodiments, each of the datums may correspond to a number of qubits. In these and other embodiments, each of the datasets may represent a quantum state of a plurality of quantum states. At block 404, a Gram matrix may be generated using a quantum computing device based on the plurality of datums.

At block 406, a plurality of operators may be determined using a classical computing device according to a constraint defined by the Gram matrix. Each of the operators may be configured as a proxy for a corresponding datum. At block 408, each operator of the plurality of operators may be assigned using the classical computing device to a label of a plurality of labels.

Modifications, additions, or omissions may be made to the method 400 without departing from the scope of the present disclosure. For example, the operations of method 400 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the described embodiments.

Figure 5:
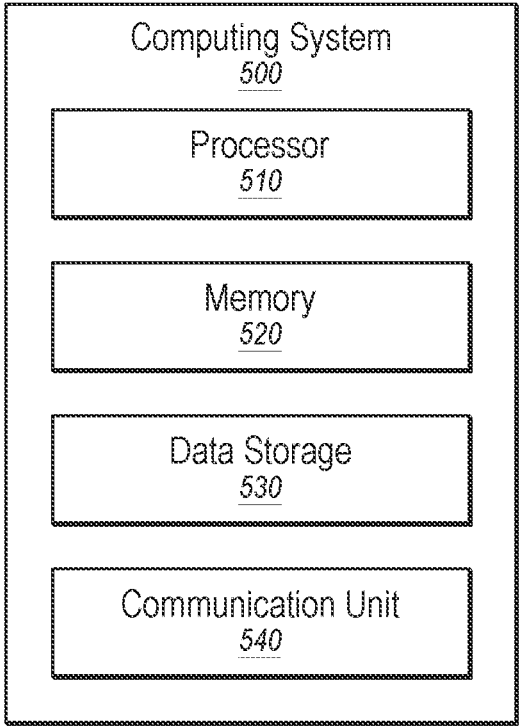
FIG. 5 illustrates an example computer system according to one or more embodiments of the present disclosure, all according to at least one embodiment described in the present disclosure.

FIG. 5 is an example computer system, in accordance with at least one embodiment of the present disclosure. The computing system 500 may include a processor 510, a memory 520, a data storage 530, and/or a communication unit 540, which all may be communicatively coupled. Any or all of the environment 100 of FIG. 1 and/or the process flow 200 of FIG. 2 may be implemented as a computing system consistent with the computing system 500.

Generally, the processor 510 may include any suitable special-purpose or general-purpose computer, computing entity, or processing device including various computer hardware or software modules and may be configured to execute instructions stored on any applicable computer-readable storage media. For example, the processor 510 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 5, it is understood that the processor 510 may include any number of processors distributed across any number of network or physical locations that are configured to perform individually or collectively any number of operations described in the present disclosure. In some embodiments, the processor 510 may interpret and/or execute program instructions and/or process data stored in the memory 520, the data storage 530, or the memory 520 and the data storage 530. In some embodiments, the processor 510 may fetch program instructions from the data storage 530 and load the program instructions into the memory 520.

After the program instructions are loaded into the memory 520, the processor 510 may execute the program instructions, such as instructions to cause the computing system 500 to perform the operations of the methods 300 or 400 of FIGS. 3 and 4. For example, the computing system 500 may execute the program instructions to obtain a multi-dimensional training, generate a Gram matrix, determine operators based on the Gram matrix, and then classify those operators.

The memory 520 and the data storage 530 may include computer-readable storage media or one or more computer-readable storage mediums for having computer-executable instructions or data structures stored thereon. Such computer-readable storage media may be any available media that may be accessed by a general-purpose or special-purpose computer, such as the processor 510. For example, the memory 520 and/or the data storage 530 may include the training dataset 202, the Gram matrix 206, and/or the labelled data 216 of FIG. 2. In some embodiments, the computing system 500 may or may not include either of the memory 520 and the data storage 530.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 510 to perform a particular operation or group of operations.

The communication unit 540 may include any component, device, system, or combination thereof that is configured to transmit or receive information over a network. In some embodiments, the communication unit 540 may communicate with other devices at other locations, the same location, or even other components within the same system. For example, the communication unit 540 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 540 may permit data to be exchanged with a network and/or any other devices or systems described in the present disclosure. For example, the communication unit 540 may allow the system 500 to communicate with other systems, such as computing devices and/or other networks.

One skilled in the art, after reviewing this disclosure, may recognize that modifications, additions, or omissions may be made to the system 500 without departing from the scope of the present disclosure. For example, the system 500 may include more or fewer components than those explicitly illustrated and described.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, it may be recognized that changes may be made in form and detail without departing from the scope of the present disclosure. Thus, the present disclosure is limited only by the claims.

In some embodiments, the different components, modules, engines, and services described herein may be implemented as objects or processes that execute on a computing system (e.g., as separate threads). While some of the systems and processes described herein are generally described as being implemented in software (stored on and/or executed by general purpose hardware), specific hardware implementations or a combination of software and specific hardware implementations are also possible and contemplated.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
  obtaining a multi-dimensional training dataset comprising a plurality of datums, each datum of the plurality of datums stored in a number of quantum bits (qubits) and represent a quantum state of a plurality of quantum states, wherein each datum of the plurality of datums represents a piece of information associated with a topic and are simultaneously stored in the qubits as multiple values comprising a zero, a one, or a superposition of both zero and one, wherein a dimensionality of the plurality of datums is based on a number of datums of the plurality of datums and the qubits storing the plurality of datums as the multiple values;
  generating, using a quantum computing device, a Gram matrix comprising a plurality of quantities based on the plurality of datums, wherein the plurality of quantities comprises a dimensionality based on a number of the qubits and the dimensionality of the plurality of datums such that the Gram Matrix is a result of exponentially sized computations due to the qubits simultaneously storing multiple values;
  determining, using a classical computing device, a plurality of operators according to a constraint defined by the Gram matrix, each operator of the plurality of operators configured as a proxy for a corresponding datum of the plurality of datums and comprising information indicating a quantum state of the corresponding datum of the plurality of datums, a dimensionality of the plurality of operators is based on a number of datums of the plurality of datums, wherein the plurality of operators are further determined using a polynomial function comprising:

$$\max \sum_{i=1}^{N} \sum_{j=1}^{N} q_j \langle j | M_i | j \rangle$$

in which N represents a number of datums of the plurality of datums, i represents a first counter variable, i represents a second counter variable, $q_j$ represents a probability that a different quantum state comprises a pure quantum state, and $M_i$ represents a current measurement operator;
  assigning, using the classical computing device, each operator of the plurality of operators to a label of a plurality of labels;
  assigning each datum of the plurality of datums to the label of the corresponding operator; and
  generating labelled data comprising the plurality of datums and corresponding assigned labels based on the labels assigned to corresponding operators of the plurality of operations.

2. The method of claim 1, wherein the obtaining the multi-dimensional training dataset comprising the plurality of datums comprises:
  obtaining a two-dimensional training dataset comprising a plurality of classical datums, each classical datum of the plurality of classical datums corresponding to a number of classical bits; and
  generating the multi-dimensional training dataset based on the two-dimensional training dataset, wherein each classical datum of the plurality of classical datums is encoded to a different datum of the plurality of datums.

3. The method of claim 1, wherein each quantity of the plurality of quantities comprises an inner product of the qubits of corresponding datum of the plurality of datums.

4. The method of claim 1, wherein the quantum computing device and the classical computing device comprises a semi-definite program configured to operate according to:

$$\max \sum_{i=1}^{N} \sum_{j=1}^{N} q_j \langle \Psi_j | M_i | \Psi_j \rangle$$

in which N represents a number of datums of the plurality of datums, i represents a first counter variable, j represents a second counter variable, $q_j$ represents a probability that a different quantum state comprises a pure quantum state, $\Psi_j$ represents the datum corresponding to the different quantum state, and $M_i$ represents a current measurement operator.

5. One or more non-transitory computer-readable storage media configured to store instructions that, in response to being executed, cause a system to perform operations, the operations comprising:
  obtaining a multi-dimensional training dataset comprising a plurality of datums, each datum of the plurality of datums stored in a number of quantum bits (qubits) and represent a quantum state of a plurality of quantum states, wherein each datum of the plurality of datums represents a piece of information associated with a topic and are simultaneously stored in the qubits as multiple values comprising a zero, a one, or a superposition of both zero and one, wherein a dimensionality of the plurality of datums is based on a number of datums of the plurality of datums and the qubits storing the plurality of datums as the multiple values;

generating, using a quantum computing device, a Gram matrix comprising a plurality of quantities based on the plurality of datums, wherein the plurality of quantities comprises a dimensionality based on a number of the qubits and the dimensionality of the plurality of datums such that the Gram Matrix is a result of exponentially sized computations due to the qubits simultaneously storing multiple values;

determining, using a classical computing device, a plurality of operators according to a constraint defined by the Gram matrix, each operator of the plurality of operators configured as a proxy for a corresponding datum of the plurality of datums and comprising information indicating a quantum state of the corresponding datum of the plurality of datums, a dimensionality of the plurality of operators is based on a number of datums of the plurality of datums, wherein the plurality of operators are further determined using a polynomial function comprising:

$$\max \sum_{i=1}^{N} \sum_{j=1}^{N} q_j \langle j | M_i | j \rangle$$

in which N represents a number of datums of the plurality of datums, i represents a first counter variable, j represents a second counter variable, $q_j$ represents a probability that a different quantum state comprises a pure quantum state, and $M_i$ represents a current measurement operator; assigning, using the classical computing device, each operator of the plurality of operators to a label of a plurality of labels;

assigning each datum of the plurality of datums to the label of the corresponding operator; and generating labelled data comprising the plurality of datums and corresponding assigned labels based on the labels assigned to corresponding operators of the plurality of operations.

6. The one or more non-transitory computer-readable storage media of claim 5, wherein the operation obtaining the multi-dimensional training dataset comprising the plurality of datums comprises:

obtaining a two-dimensional training dataset comprising a plurality of classical datums, each classical datum of the plurality of classical datums corresponding to a number of classical bits; and generating the multi-dimensional training dataset based on the two-dimensional training dataset, wherein each classical datum of the plurality of classical datums is encoded to a different datum of the plurality of datums.

7. The one or more non-transitory computer-readable storage media of claim 5, wherein each quantity of the plurality of quantities comprises an inner product of the qubits of corresponding datum of the plurality of datums.

8. The one or more non-transitory computer-readable storage media of claim 5, wherein the quantum computing device and the classical computing device comprises a semi-definite program configured to operate according to:

$$\max \sum_{i=1}^{N} \sum_{j=1}^{N} q_j \langle \Psi_j | M_i | \Psi_j \rangle$$

in which N represents a number of datums of the plurality of datums, i represents a first counter variable, j represents a second counter variable, $q_j$ represents a probability that a different quantum state comprises a pure quantum state, $\Psi_j$ represents the datum corresponding to the different quantum state, and $M_i$ represents a current measurement operator.

9. A quantum classical-hybrid computing system, comprising:

a noisy intermediate-scale quantum computing device configured to:

obtain a multi-dimensional training dataset comprising a plurality of datums, each datum of the plurality of datums stored in a number of quantum bits (qubits) and represent a quantum state of a plurality of quantum states, wherein each datum of the plurality of datums represents a piece of information associated with a topic and are simultaneously stored in the qubits as multiple values comprising a zero, a one, or a superposition of both zero and one, wherein a dimensionality of the plurality of datums is based on a number of datums of the plurality of datums and the qubits storing the plurality of datums as the multiple values;

generate a Gram matrix comprising a plurality of quantities based on the plurality of datums, wherein the plurality of quantities comprises a dimensionality based on a number of the qubits and the dimensionality of the plurality of datums such that the Gram Matrix is a result of exponentially sized computations due to the qubits simultaneously storing multiple values;

a classical computing device configured to:

determine a plurality of operators according to a constraint defined by the Gram matrix, each operator of the plurality of operators configured as a proxy for a corresponding datum of the plurality of datums and comprising information indicating a quantum state of the corresponding datum of the plurality of datums, a dimensionality of the plurality of operators is based on a number of datums of the plurality of datum, wherein the plurality of operators are further determined using a polynomial function comprising:

$$\max \sum_{i=1}^{N} \sum_{j=1}^{N} q_j \langle j | M_i | j \rangle$$

in which N represents a number of datums of the plurality of datums, i represents a first counter variable, j represents a second counter variable, $q_j$ represents a probability that a different quantum state comprises a pure quantum state, and $M_i$ represents a current measurement operator;

assign each operator of the plurality of operators to a label of a plurality of labels assign each datum of the plurality of datums to the label of the corresponding operator; and generate labelled data comprising the plurality of datums and corresponding assigned labels based on the labels assigned to corresponding operators of the plurality of operations.

10. The system of claim 9, wherein the operation obtaining the multi-dimensional training dataset comprising the plurality of datums comprises:

obtaining a two-dimensional training dataset comprising a plurality of classical datums, each classical datum of the plurality of classical datums corresponding to a number of classical bits; and generating the multi-dimensional training dataset based on the two-dimensional training dataset, wherein each classical datum of the plurality of classical datums is encoded to a different datum of the plurality of datums.

11. The system of claim 9, wherein each quantity of the plurality of quantities comprises an inner product of the qubits of corresponding datums of the plurality of datums.

\* \* \* \* \*